United States Patent [19]
Sasagaki et al.

[11] Patent Number: 5,659,822
[45] Date of Patent: Aug. 19, 1997

[54] CAMERA DISPLAY SYSTEM AND METHOD

[75] Inventors: Nobuaki Sasagaki; Takashi Saegusa, both of Kanagawa-ken,, Japan

[73] Assignee: Nikon Corporation, Tokyo, Japan

[21] Appl. No.: 377,836

[22] Filed: Jan. 25, 1995

[30] Foreign Application Priority Data

Feb. 4, 1994 [JP] Japan .................... 6-032945

[51] Int. Cl.$^6$ .................... G03B 17/18; G09G 5/22
[52] U.S. Cl. .................... 396/287; 396/291; 345/141
[58] Field of Search .................... 354/475, 474, 354/289.12; 345/128, 129, 130, 141, 143; 348/334

[56] References Cited

U.S. PATENT DOCUMENTS

| | | | |
|---|---|---|---|
| 5,191,373 | 3/1993 | Nakano | 354/474 |
| 5,218,399 | 6/1993 | Izumi et al. | 354/471 |

FOREIGN PATENT DOCUMENTS

| | | |
|---|---|---|
| 4-81731 | 3/1992 | Japan . |
| 4-81732 | 3/1992 | Japan . |
| 4-81733 | 3/1992 | Japan . |
| 4-81734 | 3/1992 | Japan . |

Primary Examiner—Safet Metjahic
Assistant Examiner—Eric Nelson
Attorney, Agent, or Firm—Oliff & Berridge

[57] ABSTRACT

A display device for use in a camera includes a display having a plurality of display units for displaying character patterns. A memory stores character patterns for a first display and character patterns for a second display. The character patterns for the second display include matching pairs of half character patterns for display in adjacent display units to form a complete pattern. A control unit controls the operation of the display device and displays the stored character patterns on the display device. Duplicate character patterns and patterns containing numerals and decimals are stored in the memory. The control unit displays the character patterns on the display such that character pattern display appears uniformly spaced to user. In the method for displaying character patterns on the display device, the character patterns for a first display and half patterns for a second display are stored in memory. After a display has been selected the character patterns are displayed on a display device.

29 Claims, 12 Drawing Sheets

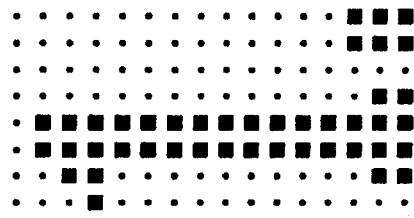
FIG.5d
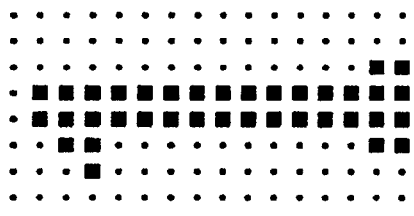
FIG.5b
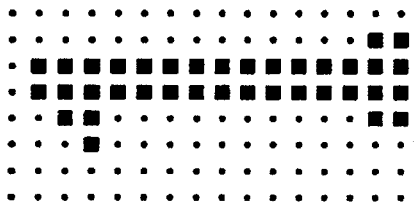
FIG.5a
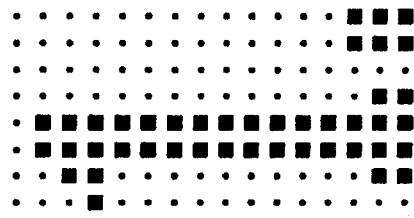
FIG.5c
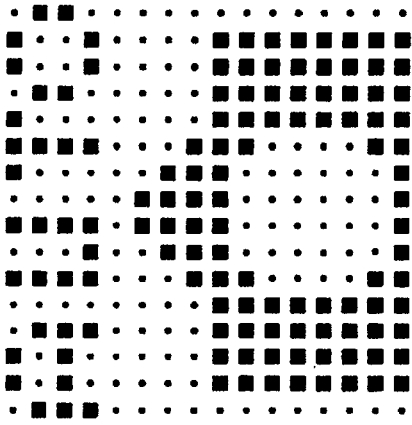
FIG.6b
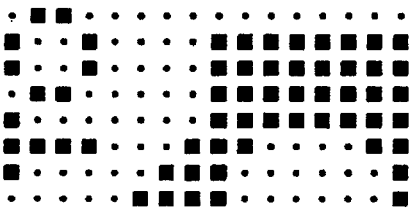
FIG.6a
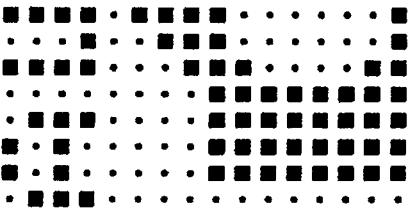

FIG.13

CAMERA DISPLAY SYSTEM AND METHOD

This application is directed to subject matter that is related to subject matter in co-pending U.S. patent application Ser. Nos. 08/378,351 entitled "Display System and Method for a Camera," 08/377,604 entitled "Camera Equipped With Warning Function and Method," 08/377,839 entitled "Camera for Selectively Inputting Operating Parameters and Method," 08/377,838 entitled "Camera Input and Display Device With Timer and Method," 08/377,840 entitled "Camera With Film Sensitivity Setting Function and Method," 08/378,449 entitled "Camera and Method for Assuring Photography With Selected Parameter," 098/377,825 entitled "Camera With Simplified Parameter Selection and Dual Mode Operation and Method of Operation"), filed simultaneously herewith by the same inventors, which are all hereby incorporated by reference.

BACKGROUND OF THE INVENTION

1. Field of the Invention

This invention relates to a camera display system and, in particular, relates to a display system suitable for a display comprised of display elements that allow the selective input of data and the display elements that provide a warning display.

2. Description of Related Art

In recent years, with the installation of computers, cameras are capable of performing numerous functions (such as, for example, automatic focusing adjustment (AF) and automatic exposure (AE)). Additionally, various substantive monitoring functions (such as, for example, monitoring the film sensitivity setting, detecting the number of frames of film, and warnings of camera deflection) have been developed. In order to confirm the operation of the multi-function and various types of monitors mentioned above, and the data in connection to these functions, for example, the setting of various types of parameters in automatic exposure, data for setting various types of parameter for adjusting the automatic focus, and the display of the monitored data have become necessary. Therefore, in recent years, cameras have been equipped with display devices such as liquid crystal displays.

Japanese Unexamined Utility Model Publication No. Hei 3-42141 discloses a display device for a camera. The developing device displays photographic information relating to the camera on a display of dot LCDs (liquid crystal display devices) located on the camera main body. The display panel of the display device is divided into a plurality of areas. The camera is equipped with a divided display device that displays sub-titled information in each area. The total display device that displays the detailed data in the display section described above, the sub-title information selection device that selects one of the sub-title information displayed by the divided display device, and the display screen switch over device that displays the subordinated data of the sub-titled information being selected, to the display section via the total display device described above, when one of the sub-titled data is selected. While the photographer watches the sub-title information being displayed, he or she accomplishes the switching operation until the desired sub-title data is displayed.

When the desired sub-title is displayed on one of the divided areas, the operation switches the corresponding areas, to select a sub-title. In this manner, when a sub-title is selected, the subordinated data of the sub-title information is displayed on the display section, via a total display device by the screen switch over device.

However, there is a problem that it is difficult to see the display in the conventional art. In other words, there is a limitation in size of the display section of the camera, of which size is also limited. Therefore, if the plurality of display elements are placed and displayed in a two dimensional manner in a limited display space, as seen in the prior art, each of the display elements are small and difficult to see. Furthermore, as various types of displays are located in a mixed manner, at one glance, it is difficult to read all the information, which has created problems. When the information cannot be read in one glance, shutter opportunities will be lost and the picture taking process cannot be carried out with the most suitable operation conditions. This may result in the danger of not seeing important warnings, in cases where some type of warning is put out by the camera.

In addition, there is another problem in the two-dimensional display that the corresponding relationship between the operation switch and the display is not easily understood. In addition, if the display is too complicated, the photographer may lose the present settings of the camera. This is another problem.

SUMMARY OF THE INVENTION

It is an object of the present invention to overcome these problems by providing a usable camera in which the data relating to the necessary parameter for setting can be easily seen by the photographer who is not accustomed with the camera.

Furthermore, it is an object to provide a camera in which the setting input operation of a parameter can be carried out easily.

According to an embodiment of this invention, to obtain the purposes described above, a camera is provided having a display system equipped with a display device with at least one display block composed of a dot matrix display section structured by m×n pieces of image elements or dots. A memory section stores a character pattern for a first display to carry out the display for each display unit described above and a character pattern for a second display composed of a pair of character patterns to carry out the display for each display block. A control unit controls the display at the display section described above, using the character pattern of the first display and the character pattern of the second display.

The display section can be structured by placing the display blocks described above in two pieces as a pair, in a horizontal manner, with a specific spacing between them, and by placing more than two pairs. In this case, display blocks can be placed between adjoining display blocks with a specific spacing between them.

In addition, the display section can be structured as one display screen, and by defining at least one pair of the display blocks described above, being placed horizontally in two pieces on the display screen. In this case, the control unit described above carries out the control by displaying the blank between the adjoining display blocks.

The memory unit described above contains data corresponding to the identical shape relative to the identical character as the character pattern for the first display. However, it further can be equipped with a different type of pattern having its display position shifted in the horizontal direction. In addition, the memory unit described above can further be equipped with a pattern indicating the numerals, including a decimal point, as the character pattern for the first display.

The plurality of display blocks can be structured having a common terminal connected in the direction of the row of dots in each display block and a segment terminal connected to each column of dots in each display block.

The display section described above is further equipped with a segment display section having a plurality of segments. In this case, it is desirable that the segment display section be composed through the placement of segments capable of displaying at least numerals. In addition, in the memory unit described above, a larger memory area can be structured for the memory of data designating the segment to flash corresponding to the pattern to be displayed in the segment display section.

The display blocks composed of at least two dot matrix display units formed with m×n dots are able to carry out a half-em pica display as the display unit, and as a whole, they are able to carry out a total-em pica display. An "em" refers to the column width with an "em" being the space occupied by an M in pica-size type. A half-em is also known as an "en", which is the space occupied by an N in pica-size type. Therefore, the display blocks are able to display with dots the pattern to be displayed in either half-em or in total-em. So, it is possible to accomplish the display in the desirable display pattern. In other words, according to this invention, characters, numerals and graphic patterns or icons are displayed on one line on the limited display space. Therefore, the size of each display element can be larger. Furthermore, since they are placed in 1-dimensional placement, the display elements can be easily seen and understood. Therefore, the displayed selection branch or warning can be easily seen, which assists in obtaining an excellent photographic result.

In addition, according to the present invention, it is possible to place the plurality of display blocks in a horizontal manner. By placing them in a horizontal manner, for example, it is possible to display the numerical values of plural digits. For example, it is possible to display the aperture, shutter speed, etc. In addition, the symbols indicating the selection branch for selection can be displayed. By so doing, information such as desired parameter, etc. can be easily selected. In this case, the selection branches are placed on one line. Therefore, the selection process is simplified. Further, the selection switches are aligned with the display blocks in a one to one corresponding relationship. This reduces operational mistakes during selection Thus, the picture taking procedure can be improved.

The memory section stores the display patterns. For example, it stores numerals, characters, icons or any other appropriate display item. The memory stores the character pattern for the first display to accomplish the display for each display unit described above and stores the character pattern for the second display composed of two character patterns, which comprise a pair, to accomplish a display for each display block described previously. By storing various types of patterns in the memory section in the manner described above, various types of displays are possible.

In addition, it is desirable that the memory contents and all possible patterns stored in the memory section be standardized in advanced. In this case, the patterns not being presently used for the camera will also be stored in the memory section. However, it is possible to use the same type of memory contents for other cameras.

The control unit permits the display section to accomplish the display using the character pattern for the first display and the character pattern for the second display. In this case, by indicating the address that stores the character pattern to the memory section, it is possible to display the selected character pattern.

In addition, when the present invention is applied to a camera, the data concerning the necessary parameter to set the operation of the camera can be easily seen by the user. Furthermore, it is possible to accomplish the parameter setting input operation easily.

BRIEF DESCRIPTION OF THE DRAWINGS

The invention will be described in conjunction with the following drawings in which like reference numerals designate like elements and wherein:

FIG. 4b is a plan view of a display block of the display panel structure of FIG. 4a;

FIG. 5 is an explanatory diagram depicting the numeral pattern placement of the display blocks in the dot matrix display section according to an embodiment of the present invention;

FIGS. 6a and 6b are explanatory diagrams depicting the section branches of the parameter selection of the display blocks in the dot matrix display section according to an embodiment of the present invention;

FIG. 13 is a table showing a sample data matrix of stored patterns for this invention.

DETAILED DESCRIPTION OF PREFERRED EMBODIMENTS

An explanation of an embodiment of the present invention is provided hereafter, with reference to the drawings.

Figure 1:
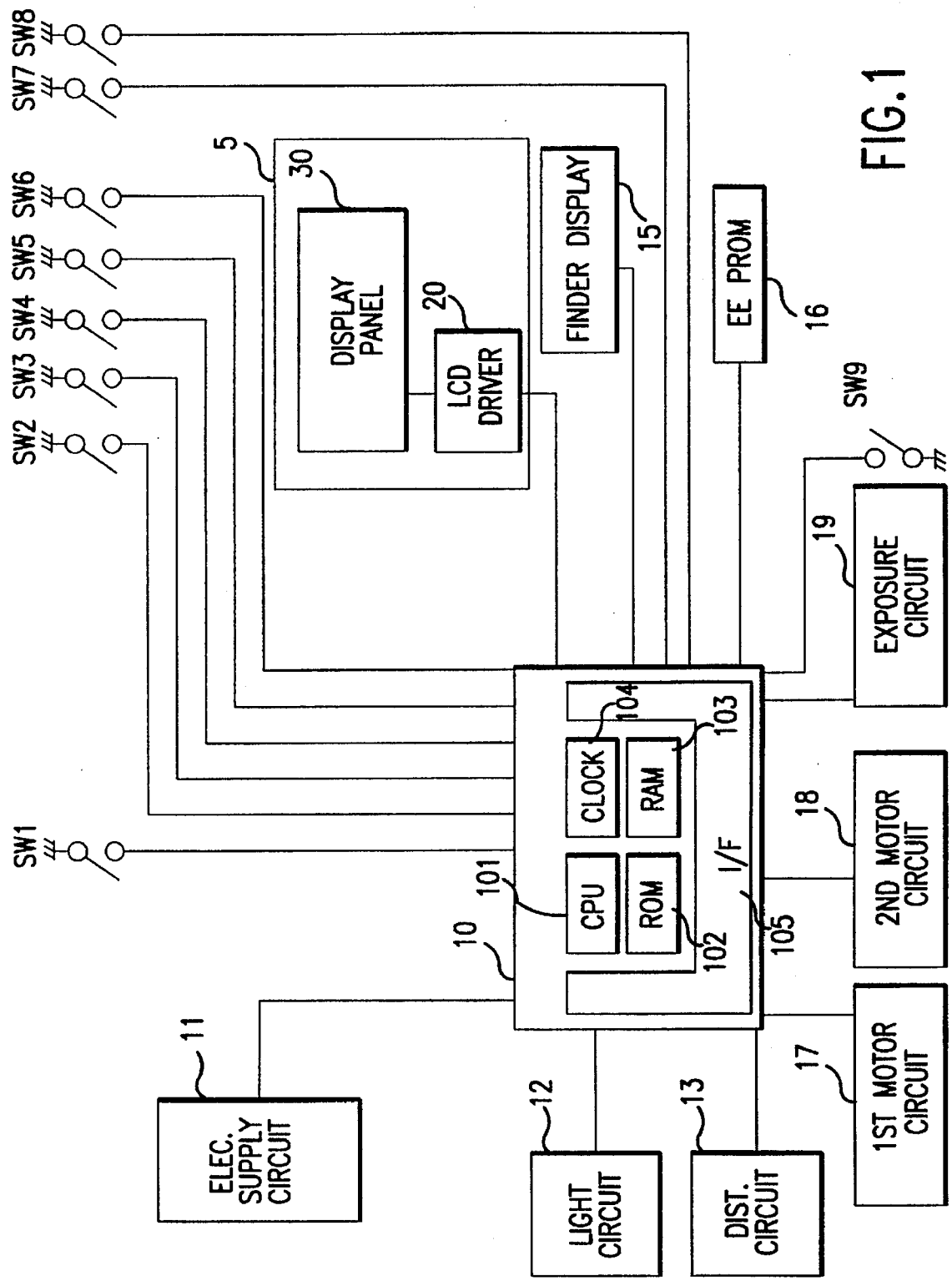
FIG. 1 is a block diagram of an embodiment of a camera having a display system according to the present invention.
Figure 2:
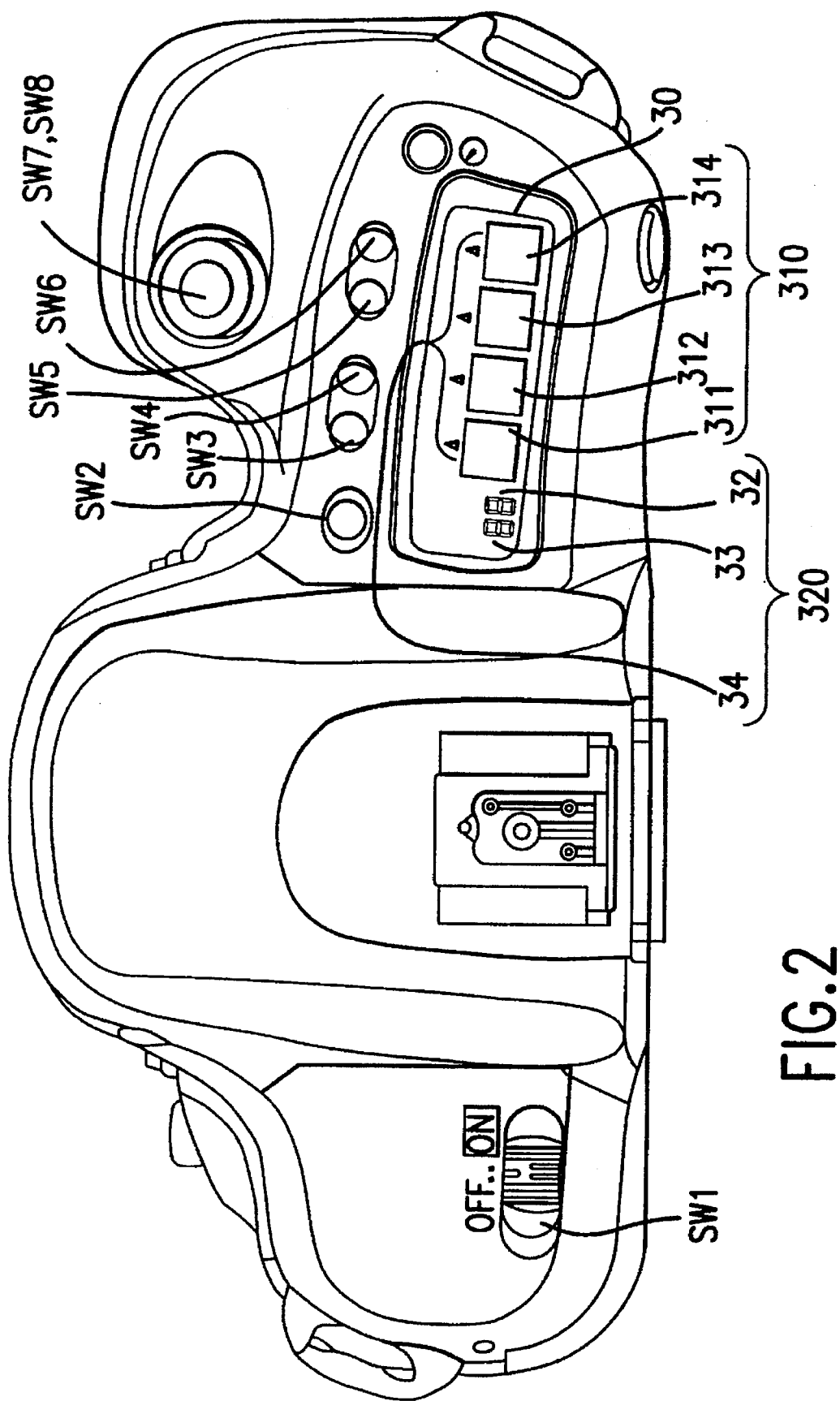
FIG. 2 is a top view of an embodiment of a camera having the display system according to the present invention.

FIG. 1 is an example of a system structure of an embodiment of a camera according to the present invention. FIG. 2 depicts the external appearance of an upper surface body of a camera according to the present invention. The embodiment, shown in FIG. 1, includes a display device 5 that displays operating data for the user. A control unit 10 controls the camera operation. The control unit 10 includes photometric circuit 12 for performing photometry, a distance survey circuit 13 for measuring distance, a DX contact 14 for reading film sensitivity, a first motor control circuit 17, a second motor control circuit 18, and an exposure control circuit 19. The control unit 10 also includes an EEPROM (read only memory capable of re-write) 16 that functions as a memory device accomplishing the memory such things as parameter data, etc., connected with a finder display device 15. The control unit 10 controls and monitors the above described operations simultaneously. The control unit 10 may also include a sensor (not shown) for monitoring the camera movement. An electric source circuit 11 is provided to supply electric power.

The first motor control circuit 17 controls the motor (not shown) driving the lens, otherwise termed a zoom drive and focus drive. The second motor drive circuit 18 controls the motor (not shown) operating the mirror up and down drive and film supply drive. The exposure control circuit 19 controls the operation of the aperture, shutter and adjustment of light.

The display device 5 has a display panel 30 installed on an upper surface of the body 1, shown in FIG. 2. The display panel 30 may contain a liquid crystal display panel, although other types of display elements can be used. An LCD driver 20 located within the body includes a driving device for the display panel 30. The display panel 30 includes a dot matrix display component 310 and a segment display component 320. The picture elements of the dot matrix display 310 and the segments of the segment display component 320 are determined by the shape and location of electrodes on the display panel 30.

Figure 4A:
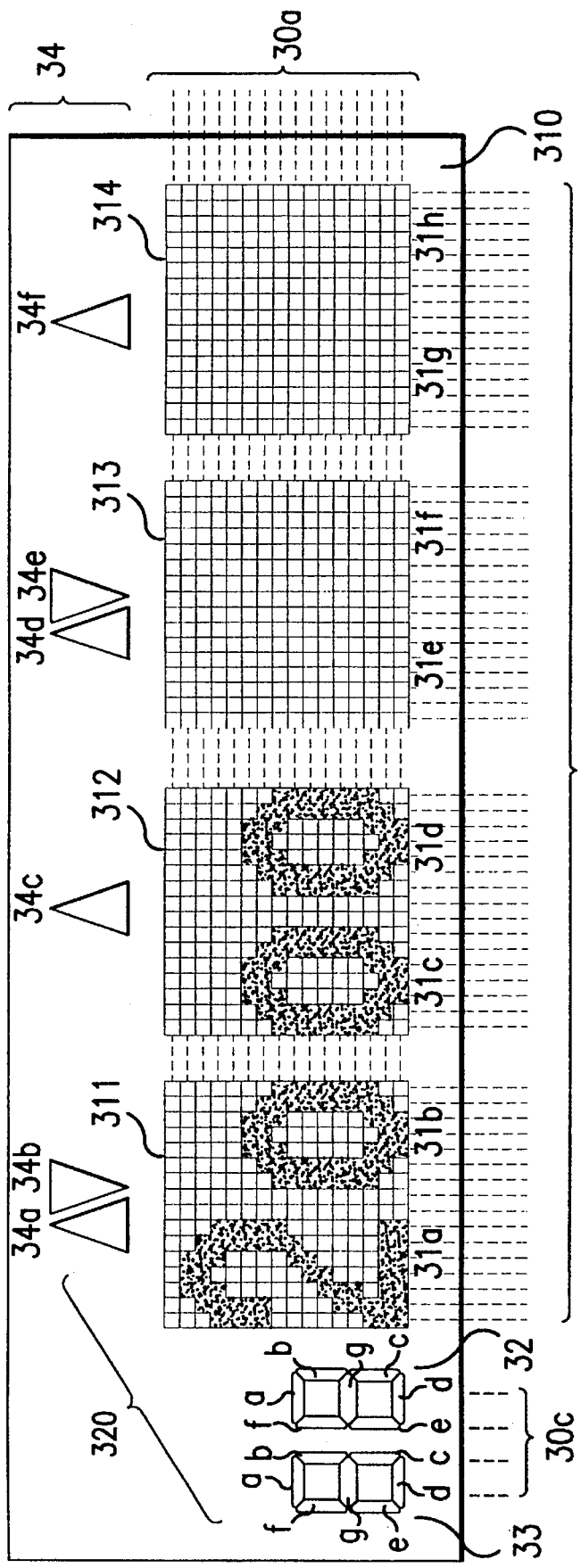
FIG. 4a is a top view of the display panel structure according to an embodiment of the present invention.

The dot matrix display component 310, shown in FIG. 4a, includes a plurality of display blocks 311, 312, 313 and 314. The display blocks 311–314 include dot matrix display units 31a–31h. Each display unit has a column width equal to an en or half em pica with an "em" being the space occupied by an "M" in pica-size type, for example. Each of the display units 31a–31h has 16 vertical dots and 8 horizontal dots. The dot matrix display units 31a–31h are arranged in pairs to form the display blocks 311–314. The display units 31a–31b, for example, are arranged together to form display block 311.

The display blocks 311–314 are horizontally spaced on the display panel 30. The spaces between the display blocks permit easy identification of the patterns, (e.g., numbers or icons) displayed within each block. In this embodiment, electrodes are not installed in the spaces between the display blocks 311–314 of the dot matrix display component 310. Alternatively, the spaces may be created using electrodes between the display blocks. With such an arrangement, a displayed space in the space area is created by displaying an empty space on the electrode (i.e. not lighting those electrodes).

Figure 4B:
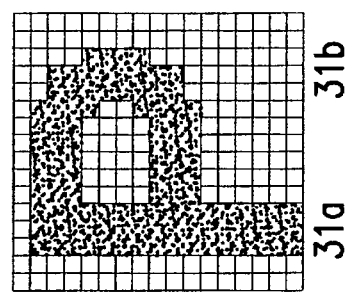

Each pair of dot matrix display units, shown in FIG. 4b, for example, has a column width equal to an em using a 16×16 dot matrix. There are eight 16×8 dot matrices in the dot matrix display component 310 connected to sixteen pieces of common terminal 30a and sixty-four pieces of the segment terminal 30b. Each display block is operated by voltage being applied to the terminals. The sixteen pieces of common terminal 30a produce a ¹/₁₆ duty cycle. The present invention, however, is not limited to the above described matrix. Other m×n matrices are possible. For example, a 24×16 matrix can be used.

The segment display component 320 is equipped with seven segment display components 32 and 33, and in auxiliary display component 34 that functions at least as the display element that indicates the corresponding relationship between the display blocks and the switches. These seven segment display components 32 and 33 are composed of seven segments a through g. The auxiliary display component 34 is structured with six pieces of triangle shaped segments (triangle segment) 34a–34f. The bases of these triangle segments 34a, 34c, 34d and 34f are placed in the direction pointing to the dot matrix display component 310 side, and in correspondence to the four em display blocks 311 through 314. In addition, the triangle segments 34b and 34e are placed in the reverse direction to the triangle segments 34a, 34c, 34d and 34f in correspondence to the display blocks 311 and 313 and adjoining the triangle segments 34a and 34d.

The segment display component 320 is composed of total of twenty segments. The terminal 30a is used in common with the dot matrix display component 310, and it is driven with a ¹/₁₆ duty cycle. Therefore, it is appropriate to use at least two pieces of segment terminals. However, it is also appropriate to increase the number of terminals slightly, taking the degree of freedom in wiring fret into consideration. In this embodiment, for example, as in Table 1, it is appropriate to use four pieces of segment terminal 30c (SEG 64 through SEG 66), using eight pieces of COM terminal (COM 0–7).

TABLE 1

|  | COM7 | COM6 | COM5 | COM4 | COM3 | COM2 | COM1 | COM0 |
| --- | --- | --- | --- | --- | --- | --- | --- | --- |
| SEG64 |  | 32g | 32f | 32e | 32d | 32c | 32b | 32a |
| SEG65 |  | 33g | 3f | 33e | 33e | 33c | 33b | 33a |
| SEG66 |  |  | 34f | 34e | 34d | 34c | 34b | 34a |

In this manner, with the present embodiment, the segmented display component only differs from the dot matrix display component in the shape. In other words, only the size of a single segment is different, and the display will have the same power value as the dot matrix display shown in FIG. 13. In this manner, when the driving is done in common, the circuit can be simplified. When the common drive of the segmented display portion is separated from the common drive of the dot matrix component and powered independently, since the characteristics of the segmented display component can be controlled independent of the dot matrix display, there is that much more possibility that the characteristics will be improved in the duty cycle or the like. However, if one considers that even if only the characteristics of the segmented display are improved, it is pointless if the characteristics of the entire display component are not improved. Further, if the characteristics of the dot matrix display component are improved there is no need to improve the characteristics of the segmented display. Therefore, it is better to employ a method that uses a common drive, as with the present embodiment.

The LCD driver 20 receives a signal from the control unit 10 and can carry out a dot display on the dot matrix component 310 through an interior character generator. At the same time, a segment display on the segment display component 320 can be carried out according to the signal received from the control unit 10. The finder LCD 15 is directly powered through the LCD exclusive output port of the control unit 10.

Figure 3:
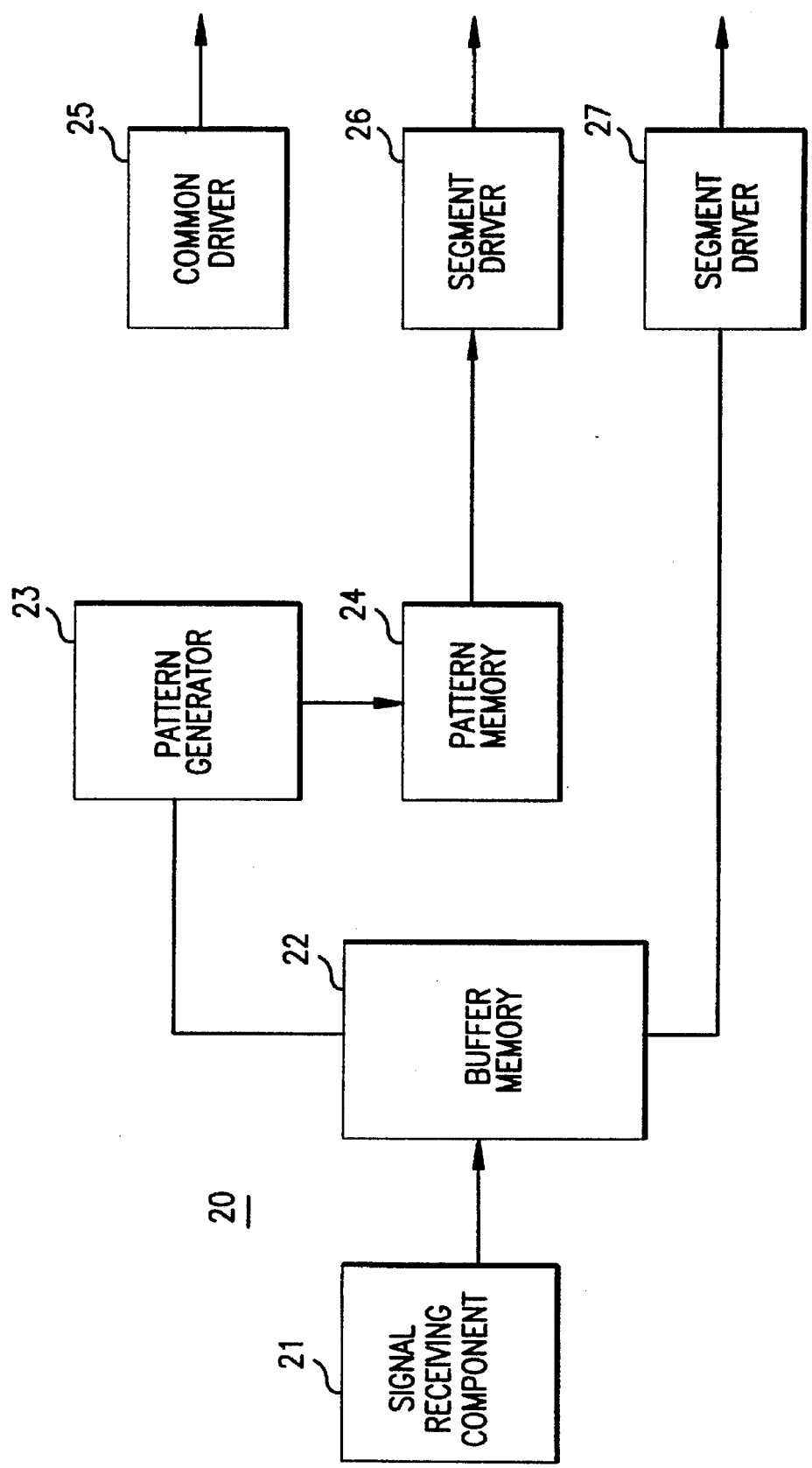
FIG. 3 is a block diagram depicting an embodiment of a liquid crystal driver structure used in the display section according to the present invention.

In FIG. 3, an example is shown of the structure of the LCD driver 20 used in the present embodiment. In the figure, the LCD driver 20 includes a signal receiving component 21, a buffer memory 22 that temporarily stores the signal data received, and a pattern generator 23 that reads data commands stored in the buffer memory 22 and generates symbol patterns directed by the commands. A pattern memory 24 records the generated patterns. A common driver 25 drives the dot matrix display component 310 and the segmented display component 320 of the display panel 30 with a common duty, a segment driver 26 reads the patterns stored in the pattern memory 24 and displays the patterns as dot displays, and a segment driver 27 reads the segment display data, which is included in the data stored in the buffer memory 22, and powers the corresponding segments.

The common driver 25 powers the common signal line of the dot matrix display component 310 and the segmented display component 320 via the above-mentioned common terminal 30a. The segment driver 26 powers the dot matrix display component 310 via the segment terminal 30b. The segment driver 27 powers the segmented display component 320 via the segment terminal 30c.

Figure 13:
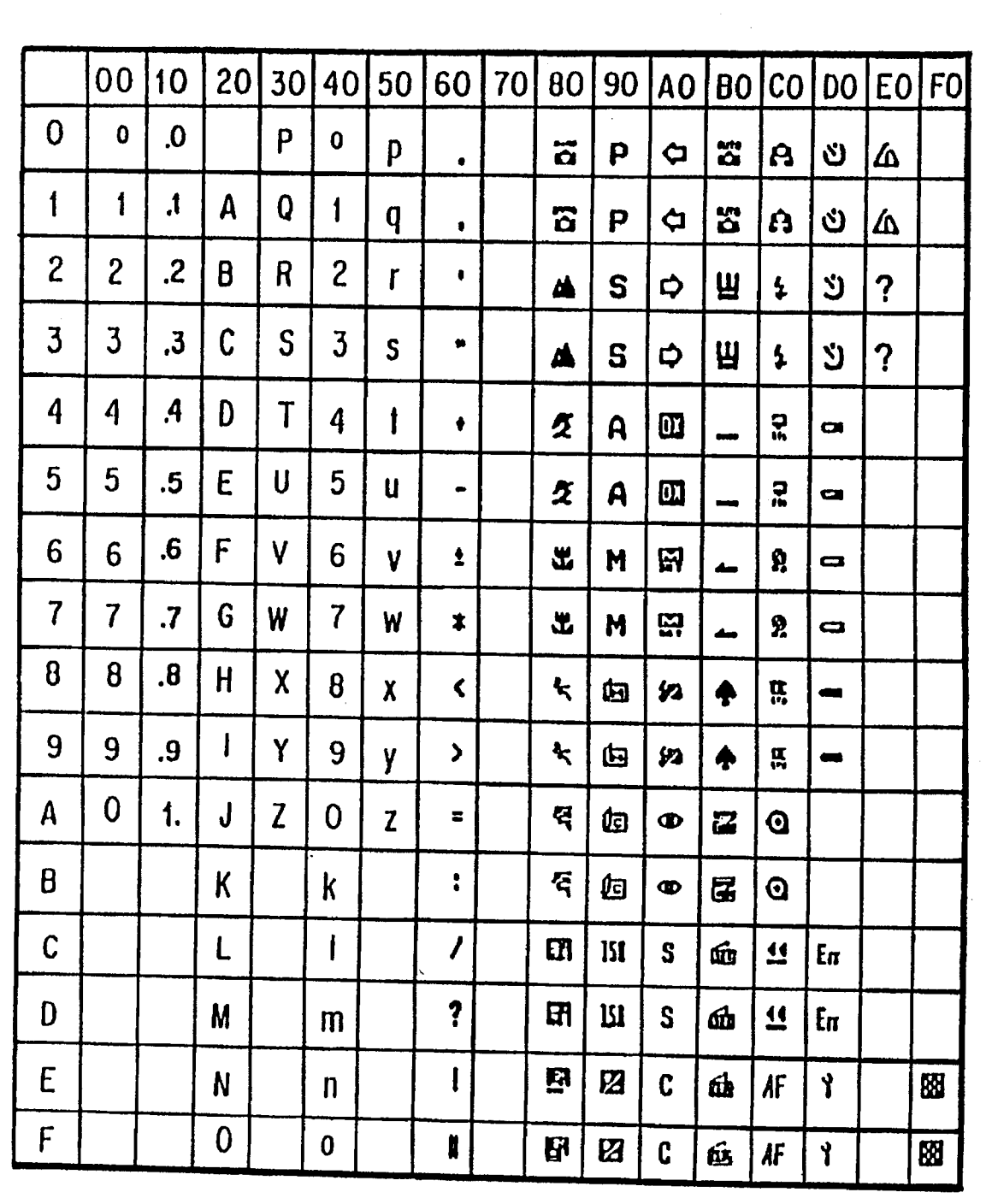

The pattern generator 23 includes a memory (not shown) and a reading drive circuit (not shown). The display patterns (character patterns) shown in the above-mentioned FIG. 13 are stored in the memory. These patterns are prepared as icons, numerals, etc. showing the content of the selection branches and as patterns that show warnings and instructions. Patterns that show numerals and characters are also included. In FIG. 13, horizontal rows correspond to the superordination addresses and the vertical columns correspond to the subordination addresses. With this particular arrangement, 256 patterns are possible.

In FIG. 13, the numeral patterns between the addresses "00"–"0A" and "40""4A" are the same as the display patterns shown in FIG. 5. The display position, however, is shifted to the left and right. By preparing patterns with display positions shifted to the left and right in this manner, when multiple numerals are shown in multiple display blocks, the shift that is caused by the space between each display block is assimilated. Thus, a well-balanced display is possible. For example, in the display "2000" shown in FIG. 4a, the characters at addresses "0A" and "4A" are both used to display the same "0." "4A" has the same shape as "0A," but is shifted one dot to the left. As a result, a large space can be left within the display block and a balance can be achieved between the display blocks. Thus, the spaces in the display as a whole can be made uniform.

In addition, with the present invention, numerical patterns are stored that already contain decimal points for numerical displays with decimals. Therefore, separate display units for decimal points can be omitted and the number of display units can be used more efficiently. In cases in which decimal points are included, well-balanced displays are possible. With the present embodiment, as shown by address "11", patterns are prepared wherein the numbers in the first decimal place are shorter than the regular numbers. This corresponds to the custom of indicating the numbers less than one with smaller characters, as in the F-stop value display of a camera.

The em-size display patterns from address "80" on show two of each pattern in FIG. 13, one succeeding the other. This is to facilitate the description of the present specification. In actuality, as shown in FIG. 6a, the first block of each pattern provides the left half of the pattern, and the last block provides the right half of the pattern. The two halves are joined together in the display, and one display pattern is formed, as shown in FIG. 6b. Additionally, in FIGS. 5 and 6, the portions shown by the small dots "." are actually blank portions, but are shown as "." in order to more simply describe the dot positions.

The control unit 10 follows a main control program. The control unit 10 includes a central processing unit (CPU) 101 that executes the various monitoring and controlling procedures of the camera, a ROM (read only memory) 102 that records programs and various constants, a RAM (random access memory) 103 that is used for storing and calculating various data that show the condition of the camera. A clock circuit 104 and an interface circuit (I/F) 105 that carries out the input and output procedures with external circuits and the like are also provided. The programs for executing the procedures, shown in the flow charts herein and described hereafter, are stored in the ROM 102 as a part of the programs that control the operations of the camera. The central processing unit 101 has a timer function. With the present embodiment, this timer is used in timer operations that will be described hereafter.

Switches SW1–SW9 are connected to the control unit 10 via the input port of the interface circuit 105. As shown in FIG. 2, switches SW1–SW8 are positioned on the top surface of the body. Switch SW1 is the power supply switch. Switch SW2 corresponds to the left-most position of the LCD display component, and functions as the mode changing operation component or menu button. Switches SW3–SW6 correspond to the four display blocks 311–314. The switches SW3–SW6 form the selection switch group. Switch SW7 is a half-depression switch operated by the first stroke of the release button. Switch SW8 is a shutter release switch operated by the second stroke of the release button. SW9 is the rear cover switch.

The display blocks 311–314 of the dot matrix display component 310 are arranged in a horizontal row, as shown in FIGS. 2 and 4. The switches of the first switch group are arranged in a row parallel to display blocks 311–314. The switches SW3–SW6 are arranged so that the position of each corresponds to the corresponding display block. The icons for the selection branches displayed on the display blocks 311–314 correspond to the switches SW3–SW6 with the operation of the control unit.

The triangular segments 34a–34f of the auxiliary display component 34 described above function as display elements to optically indicate the relationship between the selection branch icons displayed on the display blocks 311–314 and the switches SW3–SW6. In this embodiment, as shown in FIG. 2, the auxiliary display section 34 is positioned between the row of display blocks 311–314 and the first switch group.

The triangular segments 34a–34f of the auxiliary display component 34 function as display elements to optically indicate the relationship between the icons of the selected branches displayed on the display blocks 311–314 and the switches SW3–SW6. In other words, the photographer sees the icons displayed in the display blocks 311–314 and decides to select one of the icons. When he or she views the triangular segments of the auxiliary display as if they were arrows, the photographer can instinctively know which switch among switches SW3–SW6 to be depressed is the one that has an illuminated arrow pointing to that switch. A state register M0 and a mode register M1 are set up in the RAM 103. The contents stored in these registers are shown in Tables 2 and 3.

TABLE 2

| M0 | State register |
|---|---|
| 0 | unselected condition (implementation screen) |
| 1 | selection condition (selection screen) |

In other words, the state register M0 sets a flag indicating whether the data displayed in the dot matrix display component 310 constitute a first display that displays the selection branches, (selection screen), or a second display that displays the selected condition (implementation screen). In the former case, a "1" is set; in the latter case, a "0" is set.

TABLE 3

| M1 | binary | |
|---|---|---|
| 0 | 00 | program (P) mode |
| 1 | 01 | shutter priority (S) mode |
| 2 | 10 | aperture priority (A) mode |
| 3 | 11 | manual (M) mode |

In the mode register M1, one of the four modes shown in Table 3, including the program mode (P), the shutter priority mode (S), the aperture priority mode (A), and the manual mode (M) can be preferentially set with binary numbers. The selection can be carried out in the first display screen. These selections correspond to the information input into the camera, or more specifically, to the input of the parameters that regulate the operating conditions of the camera.

A shutter release prevention register M2 and a warning register M3 are provided in the RAM 103 in the control unit 10.

TABLE 4

| M2 76543210 | Release Prevention Register |
|---|---|
| xxxxxxx1 | No Remaining Battery Capacity |
| xxxxxx1x | Easy Load Warning |
| xxxxx1xx | Rewinding In Progress |

As shown in Table 4, the shutter release prevention register M2 indicates the prevention content at each position of the eight bits. In this embodiment, the examples "No Remaining Battery Capacity," "Easy Load Warning," and "Rewinding In Progress" are shown. If there are other conditions for which the shutter release should be prevented, these conditions can be assigned to any of the eight bits. With this type of bit correspondence, the number of applicable subjects is limited, but the evaluation is simplified. Therefore, in cases in which there are a large number of shutter release preventing conditions, a code should be used in place of the bit correspondence.

TABLE 5

| M3 76543210 | Warning Register |
|---|---|
| xxxxxxx1 | Strobe Recommended |
| xxxxxx1x | Camera Shaking Detected |

TABLE 5-continued

| M3 76543210 | Warning Register |
|---|---|
| xxxxx1xx | Out of Range Geared for High Brightness |
| xxxx1xxx | Out of Range Geared for Low Brightness |
| xxx1xxxx | Low Battery |

As shown in Table 5, the warning register M3 indicates the warning content at each bit position of the eight bits. In the present embodiment, the examples "Strobe Recommended," "Camera Shaking Detected," "Out of Range Geared for High Brightness," "Out of Range Geared for Low Brightness," and "Low Battery" are shown. Obviously, if there are other conditions for which warnings should be given, these conditions can be assigned to any of the eight bits. With this type of bit correspondence, the number of applicable subjects is limited, but the evaluation is simplified. Therefore, in cases in which there are a large number of warning conditions, a code should be used in place of the byte correspondence.

The control unit 10 also forms a command line on the RAM 103 that serially transmits to the LCD driver 20. An example of this command line is shown in Table 6. As shown in this table, the command line includes eleven bytes from D0 to D10. Each byte from D0 to D10 is transmitted in that order. The position of each corresponds specifically to the display units 31a–31h of the dot matrix display 310 and to segments 32, 33, and 34, respectively. Display data is stored in each byte for the respective display components.

TABLE 6

| Control Unit data | Command | Content |
|---|---|---|
| D0 | 1st byte | display data for dot matrix - 31a |
| D1 | 2 | display data for dot matrix - 31b |
| D2 | 3 | display data for dot matrix - 31c |
| D3 | 4 | display data for dot matrix - 31d |
| D4 | 5 | display data for dot matrix - 31e |
| D5 | 6 | display data for dot matrix - 31f |
| D6 | 7 | display data for dot matrix - 31g |
| D7 | 8 | display data for dot matrix - 31h |
| D8 | 9 | data for segment display 32 |
| D9 | 10 | data for segment display 33 |
| D10 | 11 | data for segment display 34 |

In the case of the segment display data D8 through D10, data that specifies which segment is to be lit among the corresponding segment display components 32, 33, and 34 through byte correspondence is recorded. In other words, D8 illuminates display segments 32a–g using bits 06, D9 illuminates display segments 33a–g using bits 0–6, and D10 illuminates display segments 34a–f using bits 0–5.

The operation of the present embodiment will now be described in connection with the flow charts of FIGS. 7–9 and the display examples shown in FIGS. 10–12.

The control unit 10 carries out the control of the camera operation, and other processes. Namely, the process to accomplish at least the first display indicating the selection branch to accomplish the pattern selection to the display block unit 311–314 described above, and to accomplish the second display in the case that the parameter is selected and designated, the process to observe the operation of each component of the camera, and the process to accomplish the display indicating the contents of the warning to the display device 5 described previously in the case that the occasion to be warned takes place as a result of the observation made by camera. In the case of this embodiment, if the warning is especially serious, the warning will be displayed in both the first and the second display modes, and if the warning is not especially serious, the warning will be displayed in the second display mode.

Figure 10:
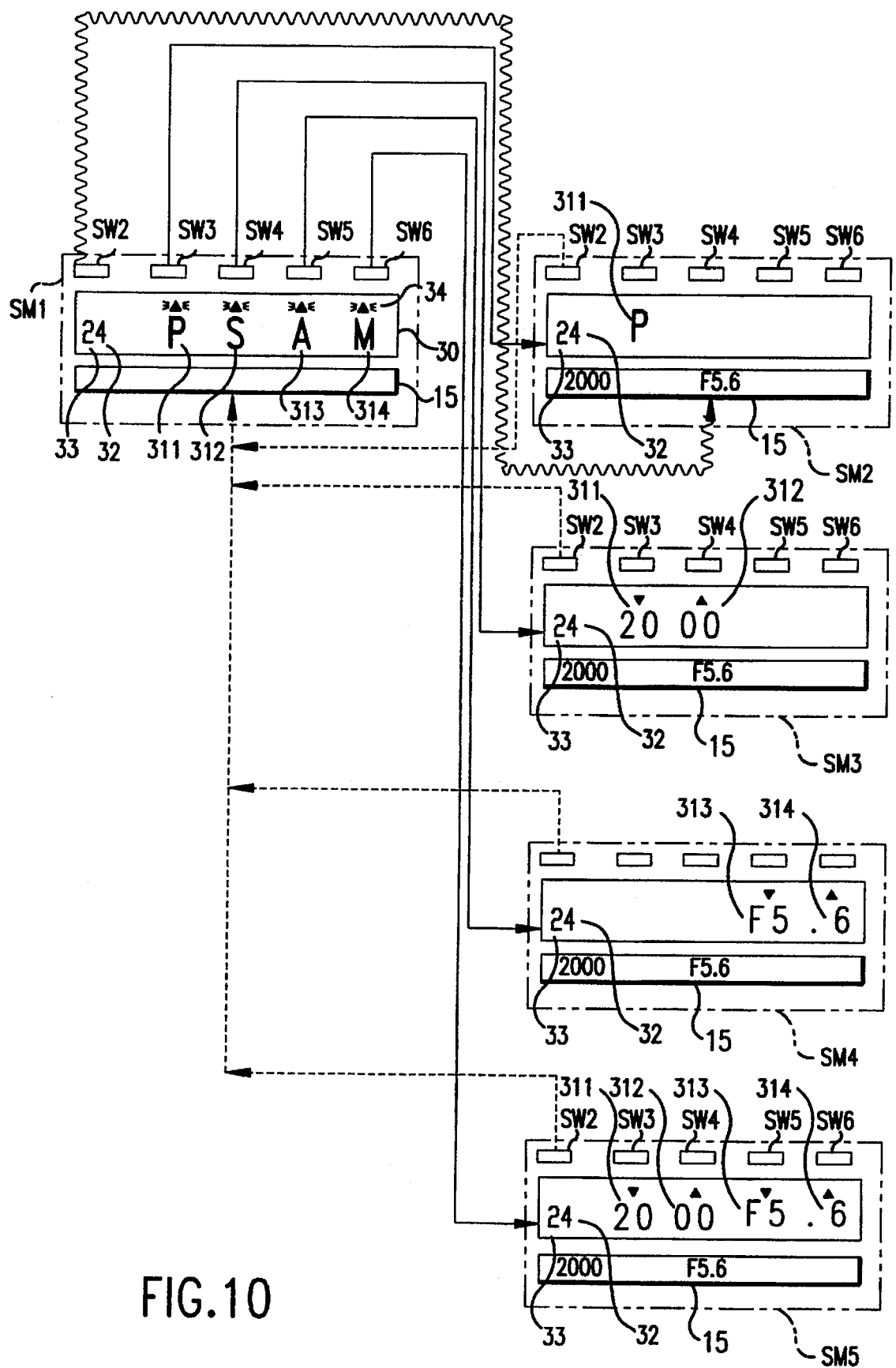
FIG. 10 is an explanatory diagram depicting the corresponding relationship between the display and the operation of the switches in the simple mode according to an embodiment of the present invention.

In FIG. 10, the corresponding relationship between the display panel and the operation of the switches SW2–SW6 is shown. In FIG. 10, the small horizontal blocks displayed at the top of the display panel 30 show the switches SW2–6, respectively. The horizontal blocks at the bottom of the display panel 30 show the display in the finder display component 15.

In FIG. 10, display SM1 shows the screen in which the condition register M0 shown in Table 2 is 1, or in other words, shows the first display condition having multiple selection branches displayed in display blocks 311–314. In this condition, the display icons P, S, A, and M, the symbols representing the program mode P, the shutter priority mode S, the aperture priority mode A, and the manual mode M, are displayed in the given order in display blocks 311–314. This is the screen from which any of these parametric selection branches can be selected. With the present embodiment, since it is shown that the selection is possible, the corresponding triangular segments of the auxiliary display component 34 are illuminated. On the segmented displays 32 and 33, two-unit numerals are displayed, and the number of film frames is displayed.

In FIG. 10, displays SM2–SM5 show respective second display screens. Namely, SM2 indicates when the switch SW3 or P is selected. In this case, the set shutter speed and aperture value are displayed in the finder display component 15. SM3 indicates when the shutter priority mode S has been selected. In this case, the shutter speed is displayed using display blocks 311 and 312. In this condition, the shutter speed can be changed using switches SW3 and SW4. SM4 indicates when the aperture priority mode A has been selected. In this case, the aperture value is shown in display blocks 313 and 314. In this condition, the aperture value can be changed using switches SW5 and SW6. SM5 indicates when the manual mode M has been selected. In this case, the shutter speed and aperture value are displayed using display blocks 311–314. These can be changed using switches SW3–SW6.

Figure 11A:
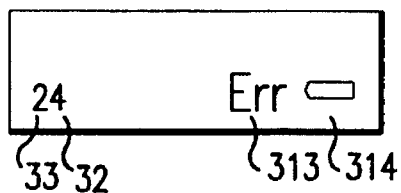
FIGS. 11a–j depict the display modes according to an embodiment of the present invention.
Figure 11F:
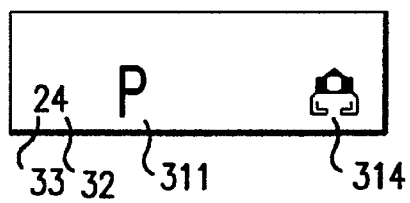
Figure 11B:
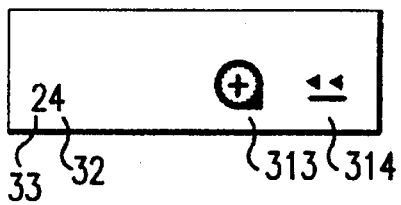
Figure 11G:
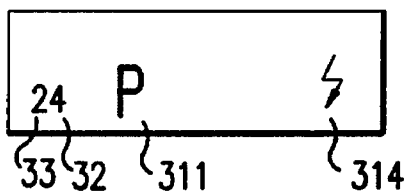
Figure 11C:
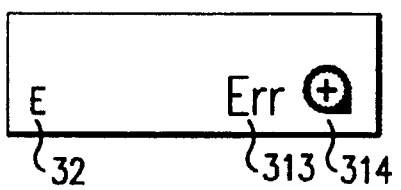

FIGS. 11a–j are examples of warnings shown. FIGS. 11a–c depict examples of serious warnings that are displayed regardless of whether or not a selection has been carried out. These displays are displayed in the same form in all modes; namely, the other displays are erased, and only the warning is displayed. Thus, confusion with other displays is avoided, and the photographer is certainly made aware of the seriousness of the condition.

FIG. 11a represents the situation when there is no battery capacity remaining, and the mark "Err" (addresses DC and DD of FIG. 13) is displayed in display block 313. In display block 314, the "battery" icon (addresses D6 and D7 of FIG. 13) is displayed. In this condition, shutter release is prevented. FIG. 11b depicts the situation when rewinding is in progress, and the icon indicating this rewinding is read from the pattern generator 23, shown in FIG. 13. Again, shutter release is prevented. FIG. 11c depicts an error in the film loading, an "E" indicating a loading error is displayed in the segmented display 32. Also, "Err" and an icon showing film are read from the pattern generator 23 shown in FIG. 13 and displayed in display blocks 313 and 314. Again, shutter release is prevented.

FIGS. 11d–j depict various display examples of cases when the warning is not serious. When the above-mentioned program mode (P) has been selected, the patterns for the icons showing warnings for low battery, outside the range geared for low brightness, camera shaking, and flash recommended are shown in display block 314 in FIG. 11d through FIG. 11g, respectively.

Figure 11H:
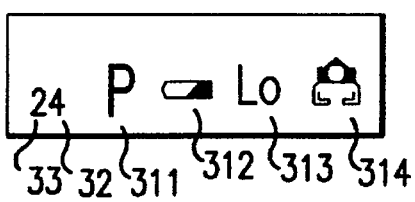
Figure 11D:
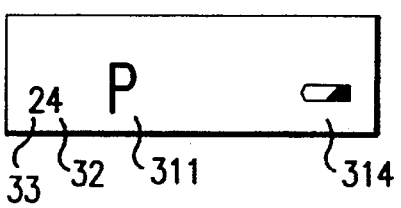

FIG. 11h shows an example in which all of these warnings are simultaneously displayed. In this case, the icons for low battery, outside the range geared for low brightness, and camera shaking are displayed in order in display blocks 312–314. The flash recommendation is determined to be relatively insignificant, and is excluded from the display. In other words, with the present embodiment, when multiple warnings are generated, these warnings are displayed in order in available display blocks. When there are no further display blocks available, the warnings are displayed in order of priority, with the lowest priority warnings excluded. Thus, if the photographer makes sure to pay attention to the warnings, the content of the warnings can be made to be easily discernible.

Figure 11I:
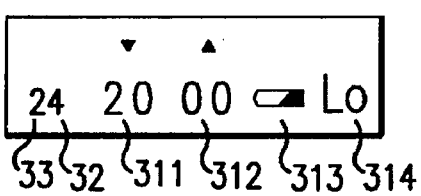
Figure 11E:
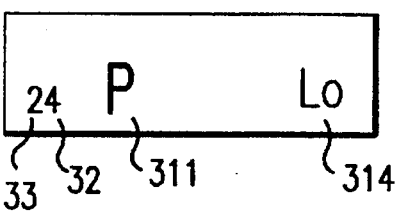
Figure 11J:
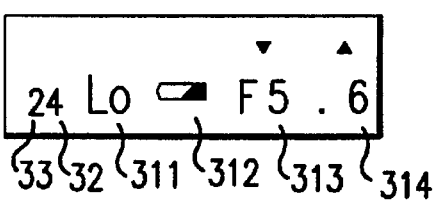

FIG. 11i shows the condition in which the icons indicating a low battery and a condition outside the range geared for low brightness are displayed in display blocks 313 and 314 in the shutter priority mode. FIG. 11j is an example in which the icons indicating a low battery and a condition outside the range geared for low brightness are displayed in display blocks 311 and 312 in the aperture priority mode. In these cases, also, if there are further warnings, the warnings with the lowest priority are excluded from the display.

Figure 12:
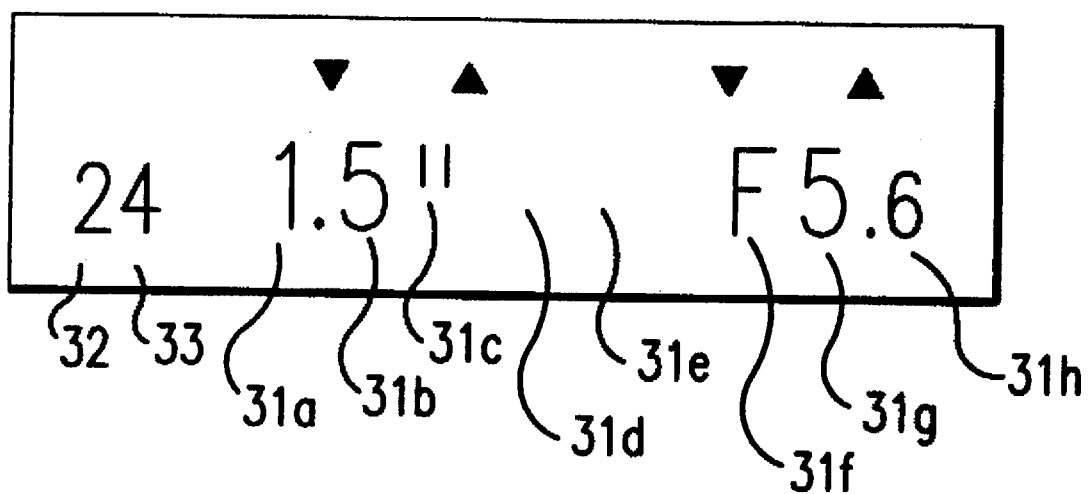
FIG. 12 is an explanatory diagram showing another example of the display mode in the embodiment according to the present invention.

FIG. 12 is another display example of the manual mode. In this example, the patterns of the following addresses of FIG. 13 are displayed in each of the display units 31a–31h 31a-"1A", 31b-"05" 31c-"63" 31d-"20", 31e-"20", 31f-"26", 31g-"05", and 31h-"16".

Figure 7:
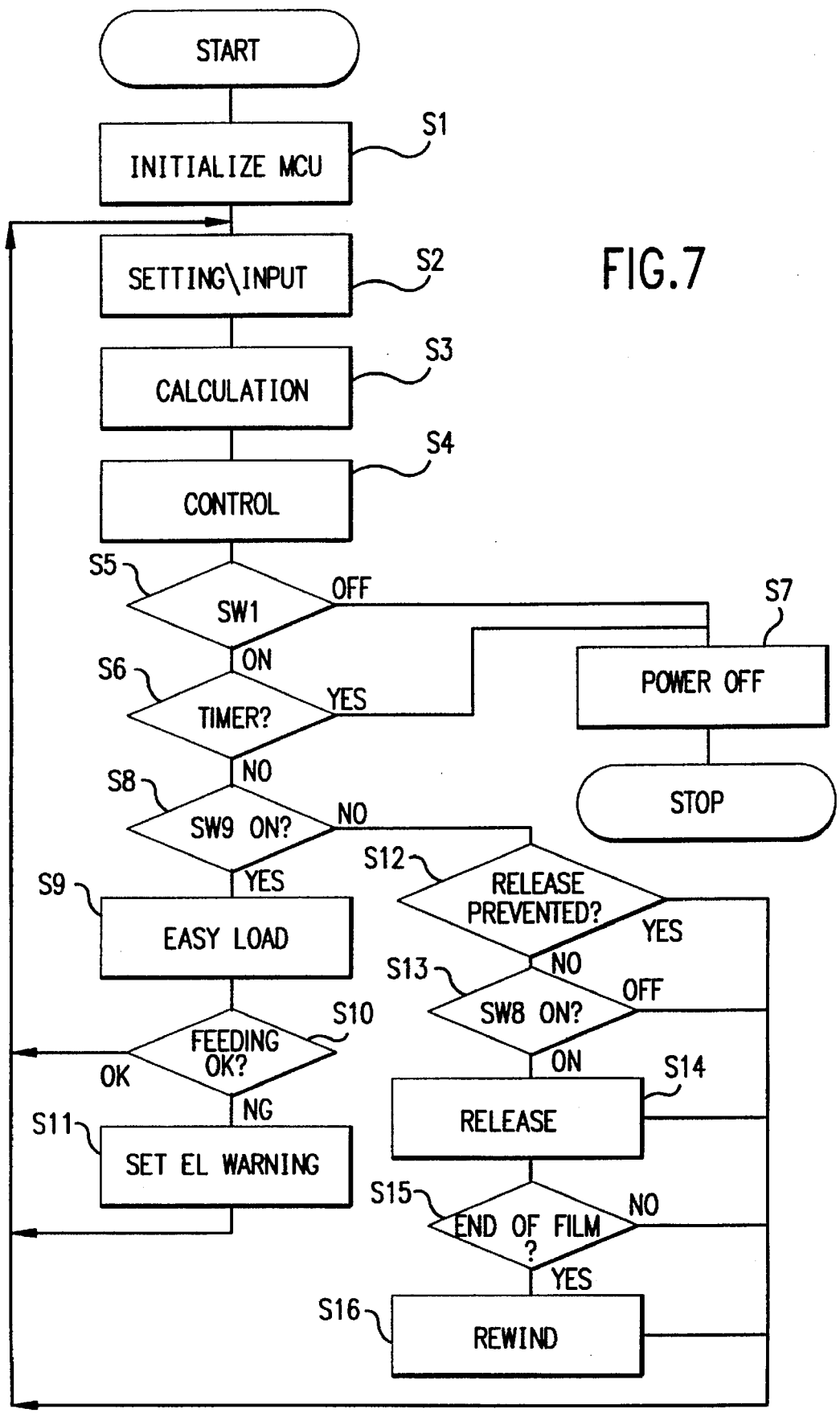
FIG. 7 is a flow chart depicting an example of the main routine of the control device according to an embodiment of the present invention.

The control unit 10 first carries out the procedure shown in FIG. 7. In other words, when switch SW2 or switch SW7 is turned on, the control unit 10 on standby (the condition in which only a minute amount of current is flowing) is interrupted and the operation of the control unit starts at step S1.

In step S1, the control unit 10 is initialized, the electric supply circuit 11 is turned on, the whole circuit receives power, the clock circuit 104 is activated, and the main clock of the control unit 10 is turned on.

In step S2, the input switch of the control unit 10 is evaluated, a setting action is carried out, and the outputs from the light measuring circuit 12 and the distance measuring circuit 13 are read into the control unit 10. This data is stored in a fixed RAM 103 in the control unit 10. At this point, the battery voltage input to the electric supply circuit 11 is evaluated. If the battery voltage is less than 4.5 V, bit 0 of the release prevention register M2 is set at "1," setting the "no battery capacity" warning. If the voltage is between 4.5–4.8, bit 4 of the warning register M3 is set as 1, setting the "low battery" warning.

In step S3, the exposure and distance measuring calculations are carried out according to the data input condition of the RAM 103 obtained in step S2. At this point, when the input from the photometric circuit 12 is at a low brightness, bit 0 of the warning register M3 is set at 1. This sets the "strobe recommended" warning. If the shutter speed, determined by the mode, is less than 1/30s, bit 1 of M3 is set at 1. This sets the "camera shaking" warning flag. In cases of high brightness in which the light measuring circuit exceeds the limits, or in cases in when the aperture closes but cannot close all the way even though the light measuring circuit 13 has not reached the limits and overexposure occurs even at high shutter speeds, bit 2 of M3 is set at 1. This sets the "outside range geared for high brightness" warning. In cases of low brightness when the light measuring circuit is below the limits, or in cases in which underexposure occurs even though the aperture is open and at low shutter speeds, byte 3 of M3 is set at 1. This sets the "outside range geared for low brightness" warning.

In step S4, the AF regulation that controls the first motor controlling circuit 17 and the display regulation that powers the LCD driver 20 are carried out.

In step S5, the control unit 10 determines whether the main switch SW1 is ON or OFF. If the switch is ON, the operation of the control unit 10 proceeds to step S6; if the switch is off, the operation proceeds to step S7.

In step S6, the control unit determines whether the electric supply maintaining timer, which clears when it has been detected through the set input procedure of S2 that one of the switches SW1 through SW7 is on, has exceeded a set value. If none of the switches are operated, the electric supply maintaining timer proceeds, but when the timer exceeds the set value the advances to step S7. Since the timer is cleared and does not exceed the set value when one of the switches SW2 through SW7 is operated and turned on, in this case the operation of the control unit proceeds to step S8.

In step S7, the power off procedure directed to the electric supply circuit 11 is executed. When the power off procedure is initialized, the actual power off occurs after various data evacuating procedures and procedures necessary to move the various mechanisms and components to the evacuated position have been carried out.

In step S8, the control unit determines whether or not the rear cover switch SW9 is activated. If the rear cover is closed, the switch is activated and the control unit proceeds to step S9. If the rear cover switch SW9 is open, or if the switch SW9 is activated but an easy load execution has been carried out, switch SW9 is not considered to be activated and the control unit proceeds to step S12.

In step S9, the second motor driving circuit 18 is driven and the film is wound a fixed amount. In other words, an easy load is executed, which is an automatic loading of the film.

In step S10, the film winding amount from the easy load is evaluated. If the easy load has ended before a fixed amount of winding, the control unit advances to step S11. If the fixed amount of winding has occurred and the easy load has proceeded normally, the control unit returns to step S2 and repeats the procedure.

In step S11, an error has occurred in the easy load, bit 1 of the release prevention register M2, shown in Table 4, is set to 1, setting the "easy load (EL) warning" flag. The control unit then returns to step S2.

In step S12, the control unit determines whether there is a release preventing condition according to the release prevention register M2. If any of the warning flags of Table 4 have been set, M2 is not equal to 0. If release is impossible, the control unit returns to step S2. Conversely, if none of the flags of Table 4 have been set, M2=0, and the control unit advances to step S13.

In step S13, the control unit determines whether the shutter release switch SW8 is ON. If the switch is OFF, the control unit returns to step S2 and repeats the procedure. If the switch is ON, the control unit advances to step S14.

In step S14, the second motor controlling circuit 18 is regulated, the exposure controlling circuit 19 is regulated, and a commonly known release procedure is carried out.

In step S15, the film feeding amount is evaluated. If the film has not been wound the length of one frame, the end of the film has been reached and the control unit proceeds to step S16. If the film has been wound the length of one frame, the control unit returns to step S2.

In step S16, the second motor controlling circuit 18 is driven and the rewinding action is carried out. During rewinding, bit 2 of the shutter release prevention register is set to 1. This sets the "rewinding in progress" flag. When the rewinding action has been completed, the control unit returns to step S2.

When the control unit returns to step S2, the procedure described above is repeated. If a warning is necessary in the procedure described above, a display is carried out according to the warning content, as shown in FIG. 11.

Figure 8:
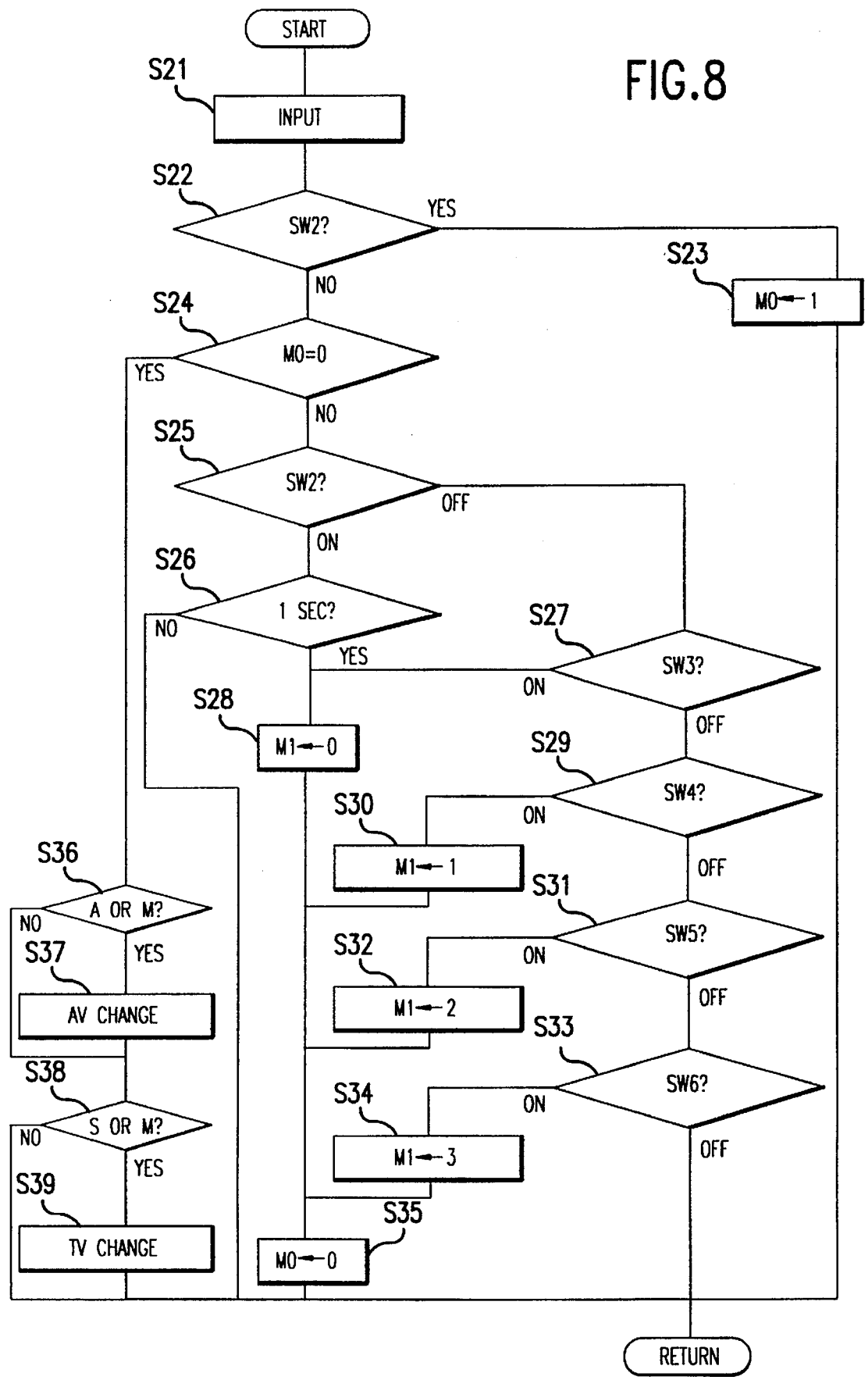
FIG. 8 is a flow chart depicting an example of the setting process sub-routine for the setting process of the main routine.

FIG. 8 is a portion of the setting routine, which is called as a sub-routine when step S2 in FIG. 7 is carried out. Through the individual selections, according to the selection content, the display changes from SM1 shown in FIG. 10 to SM1, SM3 or SM4.

In step S20, if the input of SW2 through SW7 are received and one of the switches is set at ON, the power source maintenance timer, checked in steps S7 or S8, is cleared.

In step S22, the state of SW2 is evaluated. If the switch is ON, the control unit proceeds to step S23. If switch SW2 is OFF or if switch SW2 is depressed for a length of time, the control unit advances to step S24.

In step S23, the condition register M0 is set to 1, the selection condition is set, and the control unit returns to the operations of FIG. 7.

In step S24, the control unit determines whether the condition register M0 is 0. If M0 is 0, since this is an unselected condition, the control unit advances to step S36. If the condition is a selected condition and M0=1, the control unit proceeds to step S25.

In step S25, the control unit 10 determines whether SW2 is ON or OFF. If switch SW2 is ON, the control unit proceeds to step S26. If switch SW2 is OFF, the control unit proceeds to step S27. At this point, in step S26, the control unit determines whether switch SW2 has been ON for more than one second. If switch SW2 has been depressed for more than one second, the control unit proceeds to step S28. If switch SW2 has not been depressed for more than one second, the control unit returns to the operations of FIG. 7.

In step S27, the control unit determines whether switch SW3 is ON or OFF. If switch SW3 is ON, the control unit proceeds to step S28. If switch SW3 is OFF, the control unit proceeds to step S29. In step S28, the mode register M1 is set to 0, setting the program (P) mode. The control unit then proceeds to step S35.

In step S29, the control unit determines whether switch SW4 is ON or OFF. If switch SW4 is ON, the control unit proceeds to step S30. If switch SW4 is OFF, the control unit proceeds to step S31. In step S30, the mode register M1 is set to 1, setting the shutter preference (S) mode. The control unit then proceeds to step S35.

In step S31, the control unit determines whether SW5 is ON or OFF If switch SW5 is ON, the control unit proceeds to step S32. If switch SW5 is OFF, the control unit proceeds to step S33. In step S32, the mode register M1 is set to 2, setting the aperture preference (A) mode. The control unit proceeds to step S35.

In step S33, the control unit determines whether switch SW6 is ON or OFF. If switch SW6 is ON, the control unit proceeds to step S34. If switch SW6 is OFF, the control unit returns to the operations of FIG. 7. In step S34, the mode register M1 is set to 3, setting the manual (M) mode. The control unit proceeds to S35.

In step S35, the condition register M0 is set to 0 and the control unit returns to the operations of FIG. 7.

In step S36, the control unit determines whether the camera is in the A (aperture preference) mode or the M (manual) mode. In the case of the A mode (M1=2) or M mode (M1=3), the control unit proceeds to step S37 because bit 1 of the mode register M1 is set to 1. Conversely, in the case of the P mode (M1=0) or S mode (M1=1), the control unit proceeds to step S38 because bit 1 of the mode register M1 is set to 0.

In step S37, the AV value is changed. Specifically, the aperture value (AV) setting is decremented one step by the activation of the switch SW5, or is incremented one step by the activation of SW6.

In step S38, the control unit determines whether the camera is in the S mode or the M mode. In the case of the S mode (M1=1) or the M mode (M1=3), the control unit proceeds to S39 because bit 0 of the mode register M1 is set to 1. Conversely, in the case of the P mode (M1=0) or the A mode (M1=2), the control unit returns to the operations of FIG. 7 because bit 0 of the mode register M1 is set to 0.

In step S39, the TV value is changed. Specifically, the shutter speed (TV) setting is decremented one step by the activation of switch SW3, or is incremented one step by the activation of switch SW4.

With all of these cases, displays are carried out on the display panel 30 as shown in SM3, SM4 and SM5 of FIG. 10. In the auxiliary display component 34, the incrementations and decrementations are indicated by the orientation of the triangle shape of the triangular shaped segments. Thus, the photographer can easily set the numerical values.

Figure 9:
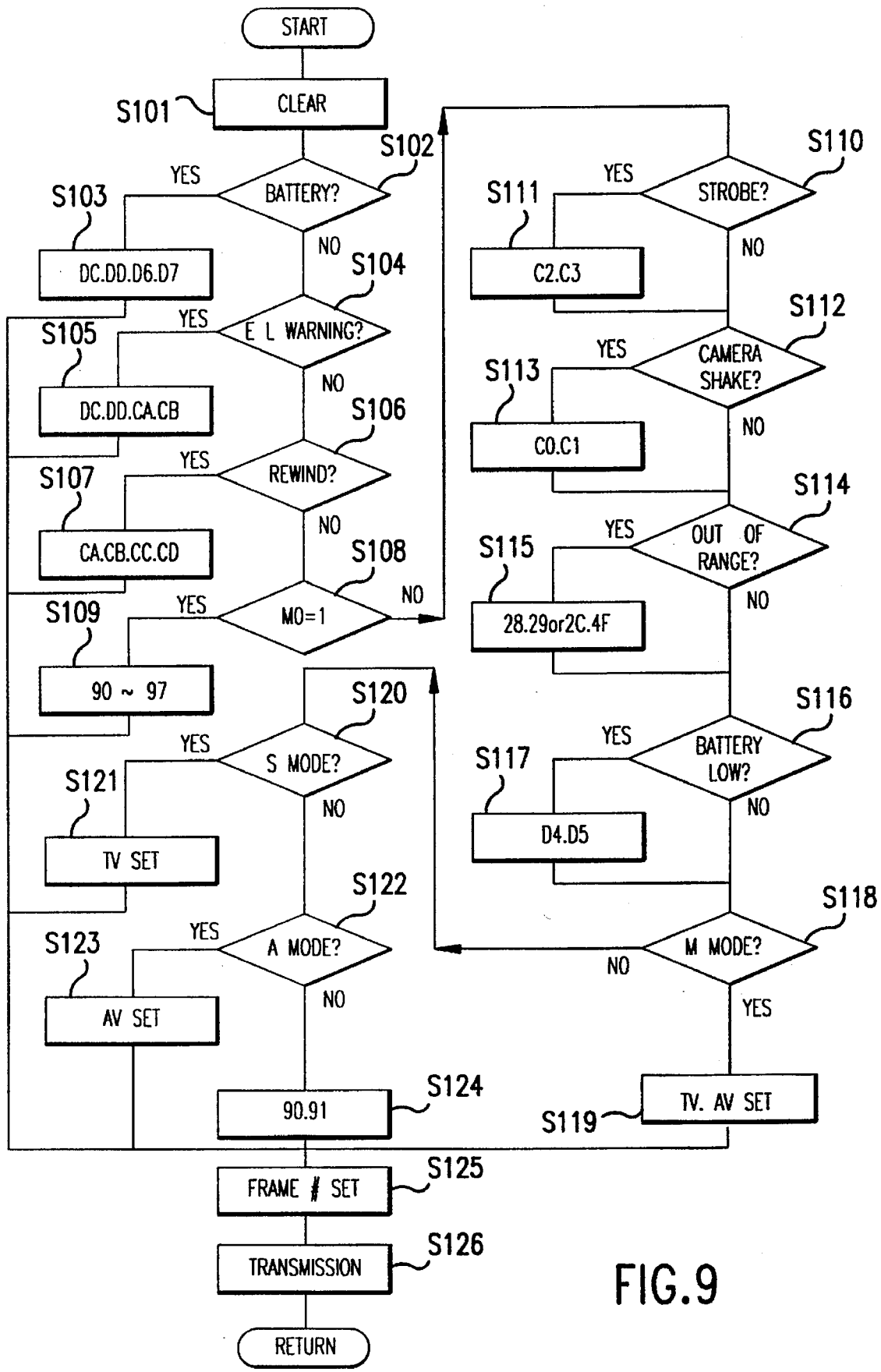
FIG. 9 is a flow chart depicting an example of the setting process sub-routine for the display process of the main routine.

FIG. 9 is a flow chart showing the display routine of the control unit 10. This routine is called as a subroutine when step S4 of FIG. 7 is carried out.

In step S101, the data regions D0–D10 of the command line transmitted to the LCD driver 20 are cleared. At this point, address "20", which is a blank display, is set in D0–D7. "0" is set in D8–D10 in order to clear the display.

In step S102, byte 0 of the release prevention register M2 is evaluated. If byte 0 is 1 (i.e., the "no remaining battery capacity" warning), the control unit advances to step S103. If bit 0 is 0, the control unit advances to step S104.

In step S103, addresses DC, DD, D6, and D7 of FIG. 13 are set as data in the transmitting data regions D4–D7 so that the "no battery" warning can be displayed. The control unit then proceeds to step S125.

In step S104, bit 1 of M2 is evaluated. If bit 1 is 1 (i.e., the "easy load" warning), the control unit advances to step S105. If bit 1 is 0, the control unit advances to step S106.

In step S105, addresses DC, DD, CA, and CB of FIG. 13 are set as data in the transmitting data regions D4–D7 so that the "easy load" warning can be displayed. The control unit then proceeds to step S125.

In step S106, bit 2 of M2 is evaluated. If bit 2 is 1 (i.e., "rewinding in progress"), the control unit proceeds to step S107. If bit 2 is 0, the control unit proceeds to step S108.

In step S107, addresses CA, CB, CC, and CD of FIG. 13 are set as data in the transmitting data regions D4–D7 so that the "rewinding in progress" display can be carried out. The control unit then proceeds to step S125.

In step S108, the condition register M0 is evaluated. If M0 is 1 (i.e., the selected condition), the control unit proceeds to step S109. If M0 is 0 (i.e., the unselected condition), the control unit proceeds to step S110.

At step S109, in order to make the total-em display of P, S, A, and M possible, 90 through 97 of Diagram 13 are set to the data area D0 through D7 as data. In addition, in order to display "Triangle ▲" of the pattern indicating the triangle segment corresponding to the total-em display of four pieces, the binary numerals "101101" corresponding to the segment display sections 34f, 34d, 34c and 34a are set to the data area D10. In addition, when the operation of the control unit is at step S109, the flashing light is set at OFF and ON, by setting the "000000," and thus the flashing display is carried out. In this mode, the display screen SM1 shown in FIG. 10 is displayed. And then, the process proceeds to step S125.

In step S110, bit 0 of the warning register M3 is evaluated. If bit 0 is 1 (i.e., "strobe recommended"), the control unit proceeds to step S111. If bit 0 is 0, the control unit proceeds to step S112.

In step S111, C2 and C3 of FIG. 13 are set as data in the transmitting data regions D0 and D1 so that the "strobe recommended" display can be carried out. The control unit then proceeds to step S112.

In step S112, bit 1 of M3 is evaluated. If bit 1 is 1 (i.e., "camera shaking"), the control unit proceeds to step S113. If bit is 0, the control unit proceeds to step S114.

In step S113, the data stored in data regions D0–D7 is two-bit shifted. In other words, the data of D0 and D1 are shifted to D2 and D3. C0 and C1 of FIG. 13 are set as data in the transmitting data regions D0 and D1 so that the "camera shaking" display can be carried out. The operation of the control unit then proceeds to S114.

In step S114, bytes 2 and 3 of M3 are evaluated. If either bit is 1 (i.e., the "out of geared range" warning), the control unit proceeds to step S115. If the bits are both 0, the control unit proceeds to step S116.

In step S115, the data stored in data regions D0–D7 is two-bit shifted. If bit 2 of M3 is 1, indicating "outside the range geared for high brightness," 28 and 29 of FIG. 13 are set as data in transmitting data regions D0 and D1 so that the "Lo" display can be carried out. The control unit then proceeds to step S116.

In step S116, bit 4 of M3 is evaluated. If bit 4 is 1 (the "low battery" warning), the control unit proceeds to step S117; if bit 4 is "0," the control unit proceeds to step S118.

In step S117, the data stored in data regions D0–D7 is two-bit shifted. D4 and D5 of FIG. 13 are set as data in transmitting data regions D0 and D1 so that the "low battery" display can be carried out. The control unit then proceeds to step S118.

In step S118, the control unit determines whether the mode register M1 is "3." If M1 is "3" (the M mode), the control unit proceeds to step S119. Otherwise, the control unit proceeds to step S120.

In step S119, the set TV value and the set AV value are set in the data regions D0–D7. For example, if an F5.6 of 2000 is set, the addresses "42", "0A" "4A" "0A" "26""05""16" and "20" of FIG. 13 are set in D0–D7 At this point, since eight bits of data are freshly set, the display set in steps S110 to S117 are all ignored. In addition, since TV values and AV values can be set in the M mode, binary numbers "110110" are set in D10 according to Table 1, making it possible to light the segment display 34fecb.

When "2000" is displayed, both addresses "0A" and "4A" are both used to display the same "0." This is because, shown in FIG. 4a, on a display that mixes an em-size display and an en-size display, which is one-half of an em-size display, the spacing of each character is essentially the same. The shift due to the space between the display blocks is absorbed, and the method of dividing the characters can produce an attractive balance. Address "4A" has the same shape as "0A," but is shifted one dot to the left. The spaces in the resulting display condition can be made uniform.

In step S120, the control unit determines whether the mode register M1 is "1." If M1 is "1" (mode S), the control unit proceeds to step S121. Otherwise, the control unit proceeds to step S122.

In step S121, the data stored in data regions D0–D7 is four-bit shifted, and the set TV value is set in data regions D0–D3. For example, if "2000" has been set, "42", "0A", "4A", and "0A" of FIG. 13 are set in D0–D3. At this point, since the data previously set in D4–D7 is freshly set by the four-bit shift, the display set in steps S110 to S113 can be ignored in the set conditions of steps S114–S117. Obviously, if there is no warning condition, only the shutter speed display will be carried out. Also, since the TB value can be set in the S mode, binary numbers "000110" are set in D10 according to Table 1, making it possible to light the segmented display 34bc.

In step S122, control unit determines whether the mode register M1 is 2. If M1 is 2 (the A mode), the control unit proceeds to step 123. Otherwise (the P mode), the control unit proceeds to S124.

In step S123, the set AV value is set in data regions D4–D7. For example, if F5.6 is set, the address "26", "05", "16", and "20" are set in D4–D7, according to FIG. 13. At this point, since the four bits of data initially set in D4–D7 are freshly set, the display set in steps S110–S113 can be ignored throughout the set conditions of steps S114–S117. Obviously, if there are no warning conditions, the display of the aperture value alone can be carried out. In addition, since the AV value can be set in the A mode, the binary numbers "110000" are set in D10 according to Table 1, making it possible to light the segmented display 34fe.

In step S124, the data stored in data regions D0–D7 is two-bit shifted, and 90 and 91 are set in data regions D0 and D1 in order to display a "P" in the dot LCD display component 31ab. If there are no warning conditions, only the "P" display is carried out. At this point, since the two-bit data initially set in D6–D7 are ignored, the content set in step S111 can be displayed in each case that has been set in steps S112 to S117. Since neither the TV value nor the AV value can be set in the P mode, binary numbers "000000" are set in D10, and the segmented display 34 is turned off.

At step S125, the frame number data are set to D8 and D9. In order to display "24," "1100110" of binary numerals are set to D8, in accordance with Table 1, in order to light the segment displays 32-g, 32-f, 32-c and 32-b, and in order to light the segment display 33-g, 33-e, 33-d, 33-b, and 33-a, "1011011" of binary numerals are set to D9.

In step S126, the data of D0–D10 set in steps S101–S125 is transmitted to the LCD driver 20, and the display can be carried out on the display panel 30.

As explained above, the characters, numerals and icons can be displayed in this embodiment using the dot matrix display section. Therefore, the photographer is able to clearly recognize the contents of the selection input of the camera operation parameter. In addition, the display can be switched using the switches corresponding plurality of display blocks. Therefore, the selection operation can be carried out with certainty without any confusion concerning the corresponding relationship between the switches and the display blocks. In addition, the necessary parameter data for setting in this embodiment, can be seen easily. Furthermore, the parameter setting input operation can be easily carried out.

In addition, this camera allows even the novice photographer to easily set the parameter. Furthermore, the setting of shutter speed, numerical value of aperture, etc. can be carried out easily, by using the corresponding switches. At that time, the increment (count up) or decrement (count down) operation can be easily understood by the illuminated triangle segments.

In the case that the numerical values are displayed, the number of display digits are reduced by displaying the pattern containing the decimal point. In addition, the placement of the patterns for numerals is determined by taking the space in which the numerals are placed into consideration. Therefore, the display of the numerical values are well balanced in the plurality of display blocks to produce a balanced display.

Embodiments of the present invention are capable of displaying warnings in the display section described previously, when a warning is necessary. For serious warning, the warning is displayed in both the first display and the second display described previously. When the warning is not determined to be serious, the warning is displayed in the second display mode only. As a result, the photographer is able to determine when counter measures should be taken immediately or at a later time.

In this embodiment, the example of the exposure mode is shown, however, the present invention is not limited only to the above. It is appropriate to apply other selection input in order to set the parameter concerning other operations. In this case, the mode register sets the mode that indicates the contents. For example, in the case that the automatic focusing is carried out in one of the plurality of display areas, one area is selected from the plurality of areas. In this case, there are many methods can be used, namely, the method to determine automatically, the method to determine by the naked eye detection, or the method to determine the area manually. Any one of the above can be applied to the selection input parameters.

According to the present invention, the information concerning the necessary parameter for setting can be easily seen by the photographer without much skill. As such, this display system in a camera permits an easy setting input operation of parameters.

What is claimed is:

1. A camera comprising:

a display device having a display with a plurality of display units for displaying a character pattern;

a memory storing character patterns for a first display and character patterns for a second display, wherein the character patterns for said second display include matching pairs of half character patterns for display in adjacent display units to form a complete pattern in said second display; and a control unit that retrieves the character patterns from said memory and controls the display of the stored character patterns of said first and second displays on said display device such that the matching pairs of half character patterns displayed in adjacent display units form a complete pattern in said second display, whereby a greater variety of patterns are displayed and a user is assured as to identity of each displayed pattern.

2. The camera according to claim 1, wherein each of said display units includes a dot matrix display section.

3. The camera according to claim 1, wherein said display device display units are grouped in pairs, each pair forming a display block, and said display device containing at least two display blocks.

4. The camera according to claim 3, wherein the display blocks are spaced in a horizontal direction.

5. The camera according to claim 4, wherein said memory for storing character patterns stores a plurality of duplicate patterns, said duplicate patterns having the same shape with different display locations such that when said duplicate patterns are displayed in said spaced display blocks by said control unit said duplicate patterns appear uniformly spaced.

6. The camera according to claim 4, wherein said character patterns stored in said memory include numerals containing decimal points.

7. The camera according to claim 6, wherein said control unit displays said numerals containing decimal points in a display block with other numerals in other display blocks such that said numerals appear uniformly spaced.

8. The camera according to claim 3, wherein each of said display units forming said display blocks is a dot matrix display section having terminals arranged in rows and columns to form said character patterns.

9. The camera according to claim 8, wherein each of said rows of terminals of one of said plurality of display units being connected with corresponding rows of terminals of said plurality of display units to form rows of common terminals.

10. The camera according to claim 9, wherein the display device further includes a segment display section having a plurality of segments and said memory storing data to display patterns on said segment display section.

11. The camera according to claim 10, wherein said common terminals of said display blocks are connected to said segments of said segment display section.

12. A display device for use in a camera comprising:
a display having a plurality of display units for displaying character patterns;
a memory storing character patterns for a first display and character patterns for a second display, wherein the character patterns for said second display include matching pairs of half character patterns for display in adjacent display units to form a complete pattern in said second display; and
a control unit that retrieves the character patterns from said memory and controls the display of the stored character patterns of said first and second displays on said display device such that the matching pairs of half character patterns displayed in adjacent display units form a complete pattern in said second display, whereby a greater variety of patterns are displayed and a user is assured as to identity of each displayed pattern.

13. The display device according to claim 12, wherein said display device display units are grouped in pairs, each pair forming a display block, and said display device containing at least two display blocks.

14. The display device according to claim 13, wherein said display blocks are spaced in a horizontal direction.

15. The display device according to claim 14, wherein said memory for storing character patterns stores a plurality of duplicate patterns, said duplicate patterns having the same shape with different display locations such that when said duplicate patterns are displayed in said spaced display blocks by said control unit said duplicate patterns appear uniformly spaced.

16. The display device according to claim 14, wherein said character patterns stored in said memory include numerals containing decimal points.

17. The display device according to claim 16, wherein said control unit displays said numerals containing decimal points in a display block with other numerals in other display blocks such that said numerals appear uniformly spaced.

18. The display device according to claim 12, wherein each of said display units forming said display blocks is a dot matrix display section having terminals arranged in rows and columns to form said character patterns.

19. The display device according to claim 18, wherein each of said rows of terminals of one of said plurality of display units being connected with corresponding rows of terminals of said plurality of display units to form rows of common terminals.

20. The display device according to claim 19, wherein the display device further includes a segment display section having a plurality of segments and said memory storing data to display patterns on said segment display section.

21. The display device according to claim 20, wherein said common terminals of said display blocks are connected to said segments of said segment display section.

22. A camera comprising:
display means for displaying a character pattern;
memory means for storing character patterns for a first display and character patterns for a second display, wherein the character patterns for said second display include matching pairs of half character patterns to form a complete pattern in said second display; and
control means for retrieving the character patterns from said memory means and controlling the display of the stored character patterns of said first and second displays on said display means such that the matching pairs of half character patterns displayed in adjacent display units form a complete pattern for said second display, whereby a greater variety of patterns are displayed and a user is assured as to identity of each displayed pattern.

23. The camera according to claim 22, wherein said memory means stores a plurality of duplicate patterns, said duplicate patterns having the same shape with different display locations such that when said duplicate patterns are displayed in said display means by said control means said duplicate patterns appear uniformly spaced.

24. The camera according to claim 22, wherein said character patterns stored in said memory means includes numerals containing decimal points and said control means displays said numerals containing decimal points on said display means with other numerals such that said numerals appear uniformly spaced.

25. A method of displaying character patterns on a display device of a camera, said method comprising the steps of:
storing character patterns for display in a first display in a memory;
storing matching pairs of half character patterns for display in a second display in said memory, wherein said half character patterns forming complete character patterns;
selecting one of said first and second displays; and
displaying said character patterns of said selected display on said display device, whereby a greater variety of patterns are displayed and a user is assured as to identity of each displayed pattern.

26. The method according to claim 25, wherein the step of displaying said character patterns of said selected display includes displaying said character patterns on a plurality of spaced display blocks.

27. The method according to claim 26, wherein said step of storing character patterns for display in a first display includes storing a plurality of duplicate patterns, said duplicate patterns having the same shape with different display locations such that when said duplicate patterns are displayed in said spaced display blocks said duplicate patterns appear uniformly spaced.

28. The method according to claim 27, wherein said character patterns stored in said memory include numerals containing decimal points.

29. The method according to claim 28, wherein said step of display said character patterns includes displaying said numerals containing decimal points in said display device with numerals such that said numerals appear uniformly spaced.

* * * * *